United States Patent
Shibata

(10) Patent No.: US 11,056,703 B2
(45) Date of Patent: Jul. 6, 2021

(54) MANUFACTURING METHOD OF UNIT CELL OF FUEL CELL

(71) Applicant: TOYOTA JIDOSHA KABUSHIKI KAISHA, Toyota (JP)

(72) Inventor: Kazunori Shibata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 186 days.

(21) Appl. No.: 16/151,415

(22) Filed: Oct. 4, 2018

(65) Prior Publication Data

US 2019/0109341 A1    Apr. 11, 2019

(30) Foreign Application Priority Data

Oct. 5, 2017    (JP) .............................. JP2017-195501

(51) Int. Cl.
| H01M 8/1004 | (2016.01) |
| H01M 8/0276 | (2016.01) |
| H01M 4/88 | (2006.01) |
| H01M 8/0273 | (2016.01) |
| H01M 8/1018 | (2016.01) |

(52) U.S. Cl.
CPC ....... H01M 8/1004 (2013.01); H01M 4/8807 (2013.01); H01M 8/0273 (2013.01); H01M 8/0276 (2013.01); H01M 2008/1095 (2013.01)

(58) Field of Classification Search
CPC ............. H01M 8/1004; H01M 8/0276; H01M 8/0271; H01M 8/242; H01M 4/881; H01M 4/8807
See application file for complete search history.

(56) References Cited

U.S. PATENT DOCUMENTS

| 2010/0047649 A1* | 2/2010 | Yamada ............... H01M 8/0286 |
| | | 429/481 |
| 2014/0287339 A1 | 9/2014 | Mitsuta et al. |
| 2015/0064600 A1 | 3/2015 | Katsuno et al. |
| 2015/0380746 A1 | 12/2015 | Fukuta et al. |
| 2016/0013504 A1* | 1/2016 | Yamamoto .......... H01M 8/0232 |
| | | 429/480 |
| 2016/0087299 A1* | 3/2016 | Van Dyke ........... H01M 8/1004 |
| | | 429/535 |
| 2016/0260989 A1* | 9/2016 | Ikeda .................. H01M 8/0273 |

FOREIGN PATENT DOCUMENTS

| CN | 105226316 A | 1/2016 |
| JP | 2012-074235 | 4/2012 |
| JP | 2014-186876 | 10/2014 |
| JP | 2015-015256 | 1/2015 |

* cited by examiner

*Primary Examiner* — Jonathan G Jelsma
(74) *Attorney, Agent, or Firm* — Finnegan, Henderson, Farabow, Garrett & Dunner, LLP

(57) ABSTRACT

A manufacturing method of a unit cell of a fuel cell, includes: preparing a membrane-electrode-gas diffusion layer assembly; preparing a frame member; bringing an inner peripheral edge of the frame member into contact with a first gas diffusion layer by pushing a convex surface and by deforming a curved portion, in a state where a surface of the frame member is in contact with a peripheral region through an adhesive bond; and joining the frame member and the membrane-electrode-gas diffusion layer assembly with the adhesive bond, in a state where the inner peripheral edge of the frame member is in contact with the first gas diffusion layer.

5 Claims, 8 Drawing Sheets

MANUFACTURING METHOD OF UNIT CELL OF FUEL CELL

CROSS-REFERENCE TO RELATED APPLICATION

This application is based upon and claims the benefit of priority of the prior Japanese Patent Application No. 2017-195501, filed on Oct. 5, 2017, the entire contents of which are incorporated herein by reference.

FIELD OF THE INVENTION

The present invention relates to a manufacturing method of a unit cell of a fuel cell.

BACKGROUND

A unit cell of a fuel cell includes a membrane-electrode-gas diffusion layer assembly and a resin frame member joined thereto. The membrane-electrode-gas diffusion layer assembly is joined to the frame member as follows. The frame member is partially heated to be soft, and then a softened portion is pressurized to flow into contact with a gas diffusion layer of the membrane-electrode-gas diffusion layer assembly. After that, the softened portion is cooled (See, for example, Japanese Unexamined Patent Application Publication No. 2015-015256).

In the above method, since the frame member needs partially heating at a high temperature for a long time to such a degree that the frame member partially flows due to pressurization, manufacturing efficiency of the unit cell of the fuel cell might decrease. In addition, the frame member is partially heated at a high temperature for a long time, which might soften, deform, and deteriorate an unintended part, so that the manufacturing efficiency might decrease.

SUMMARY OF THE INVENTION

It is an object of the present invention to provide a manufacturing method of a unit cell of a fuel cell suppressing a decrease in productivity.

The above object is achieved by a manufacturing method of a unit cell of a fuel cell, including: preparing a membrane-electrode-gas diffusion layer assembly including: an electrolyte membrane; a first catalyst layer formed on one surface of the electrolyte membrane so as to expose a peripheral region of the one surface of the electrolyte membrane; a second catalyst layer formed on another surface of the electrolyte membrane; a first gas diffusion layer joined to the first catalyst layer so as to expose the peripheral region; and a second gas diffusion layer joined to the second catalyst layer; preparing a frame member made of resin includes: an outer peripheral edge larger than the electrolyte membrane; an inner peripheral edge smaller than the electrolyte membrane and larger than the first gas diffusion layer; a curved portion positioned between the outer peripheral edge and the inner peripheral edge, and defined by a convex surface protruding from one surface of the frame member and by a concave surface concaved from another surface of the frame member; bringing the inner peripheral edge of the frame member into contact with the first gas diffusion layer by pushing the convex surface and by deforming the curved portion, in a state where the another surface of the frame member is in contact with the peripheral region through an adhesive bond; and joining the frame member and the membrane-electrode-gas diffusion layer assembly with the adhesive bond, in a state where the inner peripheral edge of the frame member is in contact with the first gas diffusion layer.

Since the curved portion of the frame member is defined by the convex surface and the concave surface, the curved portion can be easily deformed by pushing the convex surface, whereby the inner peripheral edge of the frame member and the first gas diffusion layer are brought into contact with each other. This eliminates the need to heat the frame member at a high temperature for a long time, thereby suppressing a decrease in productivity.

Positioning the membrane-electrode-gas diffusion layer assembly, and a first part of the frame member between the curved portion and the outer peripheral edge, on a support base, before the bringing of the inner peripheral edge of the frame member into contact with the first gas diffusion layer, may be included.

Holding a second part of the frame member between the curved portion and the first part of the frame member positioned, to the support base, before the bringing of the inner peripheral edge of the frame member into contact with the first gas diffusion layer, may be included.

In the bringing of the inner peripheral edge of the frame member into contact with the first gas diffusion layer, the convex surface may be pushed while the curved portion is heated.

In the bringing of the inner peripheral edge of the frame member into contact with the first gas diffusion layer, the convex surface may be pushed while the curved portion is heated at a temperature below a melting point of the frame member.

The curved portion may include first and second curved portions respectively provided along first and second sides of the inner peripheral edge adjacent to each other, and the frame member may include a notch portion continuous to the inner peripheral edge and separating the first and second curved portions from each other.

DETAILED DESCRIPTION

Figure 1:
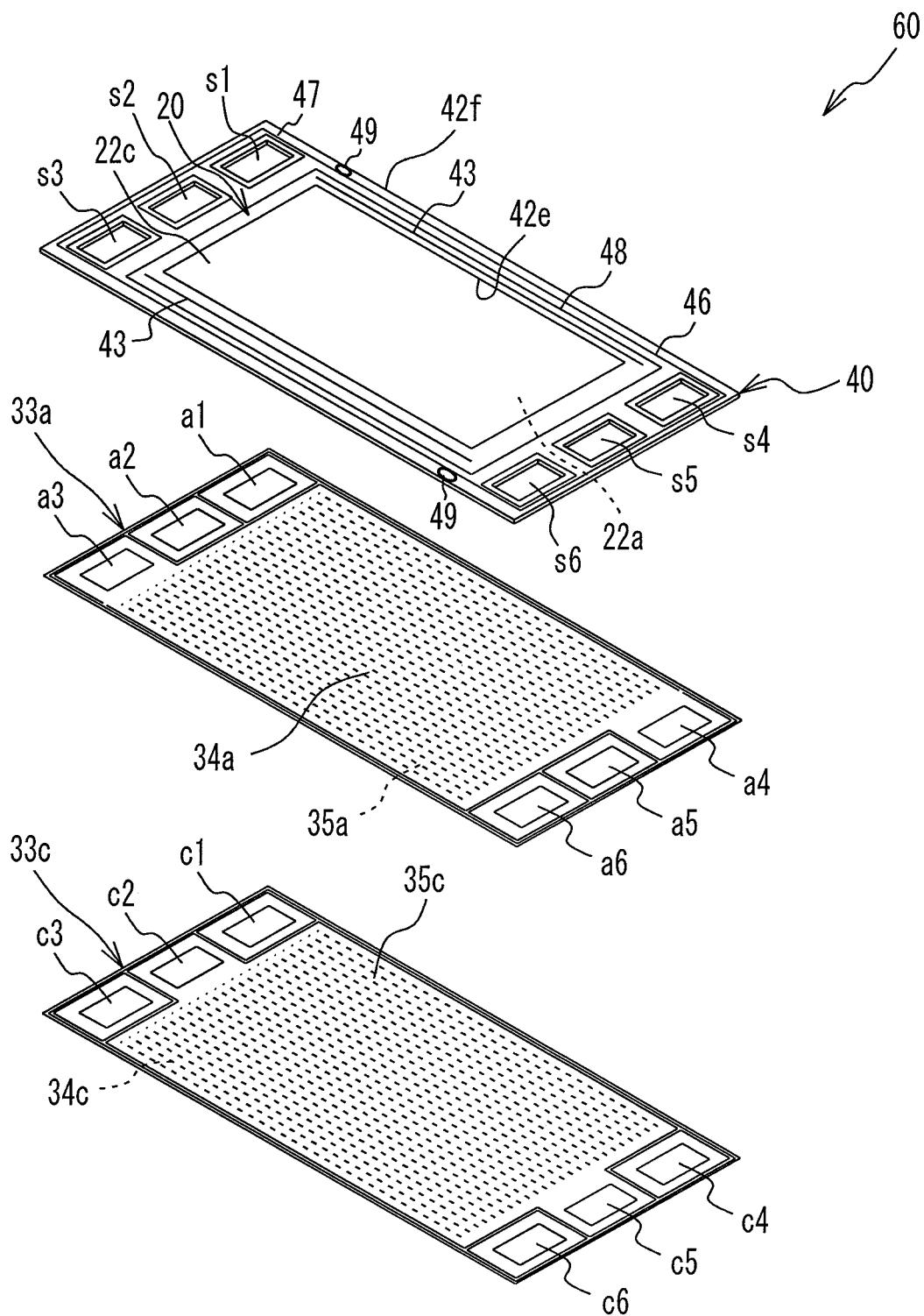
FIG. 1 is an exploded perspective view of a unit cell of a fuel cell.

FIG. 1 is an exploded perspective view of a unit cell 60 of a fuel cell. The fuel cell is configured by stacking the unit cells 60. This fuel cell is a polymer electrolyte fuel cell that generates electric power by receiving a fuel gas (for example, hydrogen) and an oxidant gas (for example, oxygen) as reaction gases. The unit cell 60 includes a membrane-electrode-gas diffusion layer assembly 20 (hereinafter referred to as MEGA (Membrane Electrode Gas diffusion layer Assembly)) and an anode side separator 33a and a cathode side separator 33c (hereinafter referred to as a separator). The MEGA 20 includes an anode side gas diffusion layer 22a and a cathode side gas diffusion layer 22c (hereinafter referred to as a diffusion layer).

A frame member 40, made of resin, having an insulating property, is formed into a substantially frame shape having an inner peripheral edge 42e and an outer peripheral edge 42f. The outer peripheral edge 42f is larger than the MEGA 20. The inner peripheral edge 42e is smaller than an electrolyte membrane 11 of the MEGA 20 described later and is smaller than the diffusion layer 22c. The MEGA 20 is joined to the inner peripheral edge 42e side. Holes s1 to s3 are formed along one of two short sides of the frame member 40, and holes s4 to s6 are formed along the other side. Likewise, holes a1 to a3 are formed along one of two short sides of the separator 33a, and holes a4 to a6 are formed along the other side. Holes c1 to c3 are formed along one of two short sides of the separator 33c, and holes c4 to c6 are formed along the other side. The holes s1, a1, and c1 communicate to one another and define a cathode inlet manifold. Likewise, the holes s2, a2 and c2 define a coolant outlet manifold. The holes s3, a3 and c3 define an anode outlet manifold. The holes s4, a4 and c4 define an anode inlet manifold. The holes s5, a5, and c5 define a coolant inlet manifold. The holes s6, a6, and c6 define a cathode outlet manifold.

A surface of the separator 33a facing the MEGA 20 is formed with anode flow paths 34a along which the fuel gas flows and which communicate between the anode inlet manifold and the anode outlet manifold. A surface of the separator 33a opposite to the anode flow path 34a, and a surface of the separator 33c facing the separator 33a are respectively formed with coolant flow paths 35a and 35c along which the coolant flows and which communicate between the coolant inlet manifold and the coolant outlet manifold. A surface of the separator 33c opposite to the coolant flow path 35c is formed with cathode flow paths 34c along which the oxidant gas flows and which communicate the cathode inlet manifold and the cathode outlet manifold. Additionally, the separators 33a and 33c are made of material with a gas barrier property and electro-conductivity, and may be made of a pressed stainless steel, a thin plate-shaped member made of metal such as titanium and titanium alloy, or a carbon member such as dense carbon.

Gaskets 46 to 48 are provided on the frame member 40. The gasket 46 has a frame shape along the outer peripheral edge 42f of the frame member 40. The gaskets 47 are provided around the respective holes s1 to s6 and each have a frame shape surrounding each of the holes s1 to s6. The gasket 48 has a frame shape surrounding the MEGA 20. The gaskets 46 to 48 are made of elastic rubber. The gaskets 46 to 48 are separately formed and joined on the frame member 40, but not limited thereto. The frame member 40 and at least one of the gaskets 46 to 48 may be integrally formed and made of the same material or different materials. Further, the frame member 40 is formed with curved portions 43 between the gasket 48 and the inner peripheral edge 42e, and the curved portions 43 extend along respective two long sides of the frame member 40. Furthermore, two positioning holes 49 are formed on the frame member 40 outside the gasket 46 and on a substantially diagonal line of the MEGA 20. The curved portion 43 and the positioning hole 49 will be described later in detail.

Figure 2:
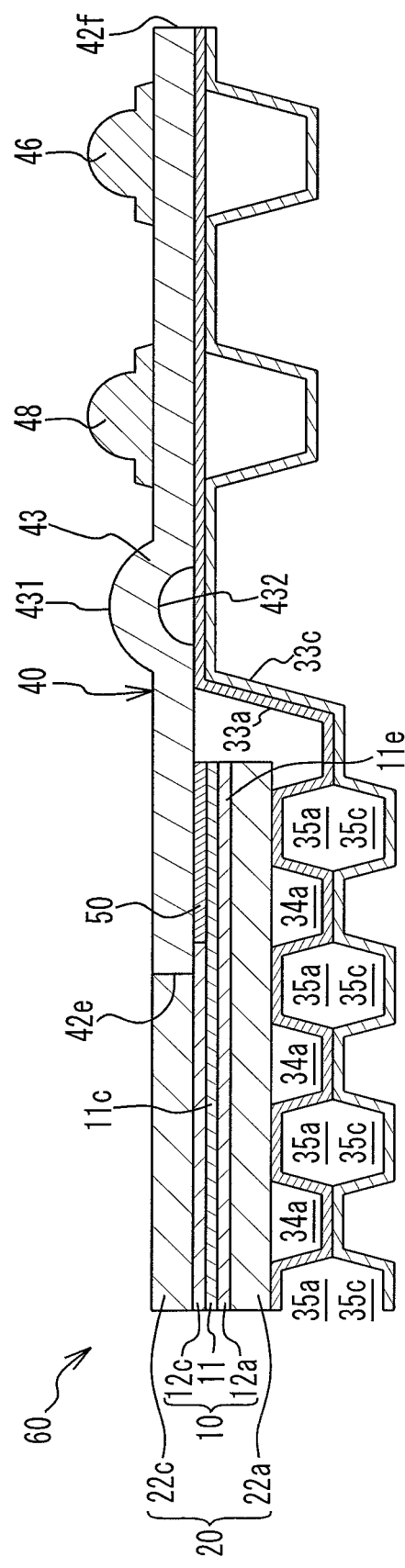
FIG. 2 is a partially cross-sectional view of the unit cell of the fuel cell.

FIG. 2 is a partially cross-sectional view of the unit cell 60. The MEGA 20 includes the above-described diffusion layers 22c and 22a and a membrane electrode assembly (hereinafter referred to as MEA) 10. The MEA 10 includes the electrolyte membrane 11 having a substantially rectangular shape, and a cathode side catalyst 12c and an anode side catalyst 12a (hereinafter referred to as a catalyst layer) respectively formed on one surface (upper surface in FIG. 2) and the other surface (lower surface in FIG. 2) of the electrolyte membrane 11. The electrolyte membrane 11 is a solid polymer thin film, such as a fluorine-based ion exchange membrane, with high proton conductivity in a wet state. The electrolyte membrane 11 has a peripheral region 11e and a central region 11c surrounded by the peripheral region 11e.

The catalyst layer 12c is formed in the center region 11c on one surface of the electrolyte membrane 11 but not in the peripheral region 11e. The catalyst layer 12a is formed so as to substantially align its end with the end of the electrolyte membrane 11. That is, the catalyst layer 12a is formed substantially over the entire other surface of the electrolyte membrane 11 including the peripheral region 11e and the central region 11c of the electrolyte membrane 11. The catalyst layer 12c is an example of a first catalyst layer formed on one surface of the electrolyte membrane 11 so as to expose the peripheral region 11e of one surface of the electrolyte membrane 11. The catalyst layer 12a is an example of a second catalyst layer formed on the other surface of the electrolyte membrane 11. The catalyst layers 12a and 12c are made by coating a catalyst ink containing a carbon support carrying platinum (Pt) or the like and an ionomer having proton conductivity on the electrolyte membrane 11.

The diffusion layers 22c and 22a are joined to the catalyst layers 12c and 12a, respectively. The diffusion layers 22c and 22a are made of a material having gas permeability and electro-conductivity, for example, a porous fiber base material such as carbon fiber or graphite fiber. The diffusion layer 22c is provided so as to position an end thereof slightly inwardly from the end of the catalyst layer 12c or to substantially align the end of the diffusion layer 22c therewith. Thus, the diffusion layer 22c is provided so as to overlap the central region 11c of the electrolyte membrane 11 through the catalyst layer 12c but not to overlap the peripheral region 11e. Accordingly, the diffusion layer 22c is provided so as to expose the peripheral region 11e. The diffusion layer 22c is an example of a first gas diffusion layer joined to the catalyst layer 12c so as to expose the peripheral region 11e. The diffusion layer 22a is an example of a second gas diffusion layer joined to the catalyst layer 12a.

Likewise, the diffusion layer 22a is provided so as to substantially align its end with an end of the catalyst layer 12a, and the catalyst layer 12a is formed substantially over the entire other surface of the electrolyte membrane 11 as described above. Therefore, the diffusion layer 22a is provided so as to overlap not only the central region 11c but also the peripheral region 11e through the catalyst layer 12a. Since the diffusion layer 22a is provided so as to also overlap the peripheral region 11e in such a way, the MEA 10 is stably supported.

The frame member 40 is a member for preventing cross leak and electrical short circuit between catalyst electrodes. The frame member 40 is joined to the separator 33a. The separator 33c is joined to the other side of the separator 33a opposite to one side thereof to which the frame member 40 is joined. The inner peripheral edge 42e of the frame member 40 is in contact with the outer periphery of the diffusion layer 22c.

A part of the surface of the frame member 40 close to the inner peripheral edge 42e and the electrolyte membrane 11

(the lower surface in FIG. 2) is joined to the peripheral region 11e of the electrolyte membrane 11 with an adhesive bond 50. The adhesive bond 50 is, for example, an ultraviolet curable resin, but may be a thermosetting resin.

The curved portion 43 and the gaskets 46 and 48 are provided between the inner peripheral edge 42e and the outer peripheral edge 42f of the frame member 40. The curved portion 43 is defined by a convex surface 431 protruding from one surface of the frame member 40 opposite to the electrolyte membrane 11, and by a concave surface 432 positioned at the opposite side of the convex surface 431 and recessed from the other surface. As illustrated in FIG. 2, the convex surface 431 and the concave surface 432 each have a smoothly curved shape. The curved portion 43 extends in the direction perpendicular to the sheet of FIG. 2. Since the frame member 40 is made of a material having elasticity, the curved portion 43 can also be elastically deformed to some extent. The curved portion 43 is formed between the inner peripheral edge 42e and the gasket 48. Further, the concave surface 432 is positioned above the separator 33a, but is spaced apart from the surface of the separator 33a. One surface of the frame member 40 is opposite to the electrolyte membrane 11. The other surface of the frame member 40 is close to the electrolyte membrane 11.

The unit cells 60 are stacked to configure the fuel cell. Thus, in the fuel cell, the MEGA 20 and the frame member 40 illustrated in FIG. 2 are sandwiched between the illustrated separator 33a and a cathode separator of non-illustrated another unit cell adjacent to the upper side of the unit cell 60 of FIG. 2. Further, an MEGA and a frame member of another non-illustrated unit cell adjacent to the lower side of the unit cell 60 of FIG. 2 are sandwiched between the anode separator of this non-illustrated unit cell and the separator 33c of FIG. 2. Furthermore, the gaskets 46 to 48 are compressed by a cathode separator of the other non-illustrated unit cell adjacent to the upper side of the unit cell 60.

Figure 3:
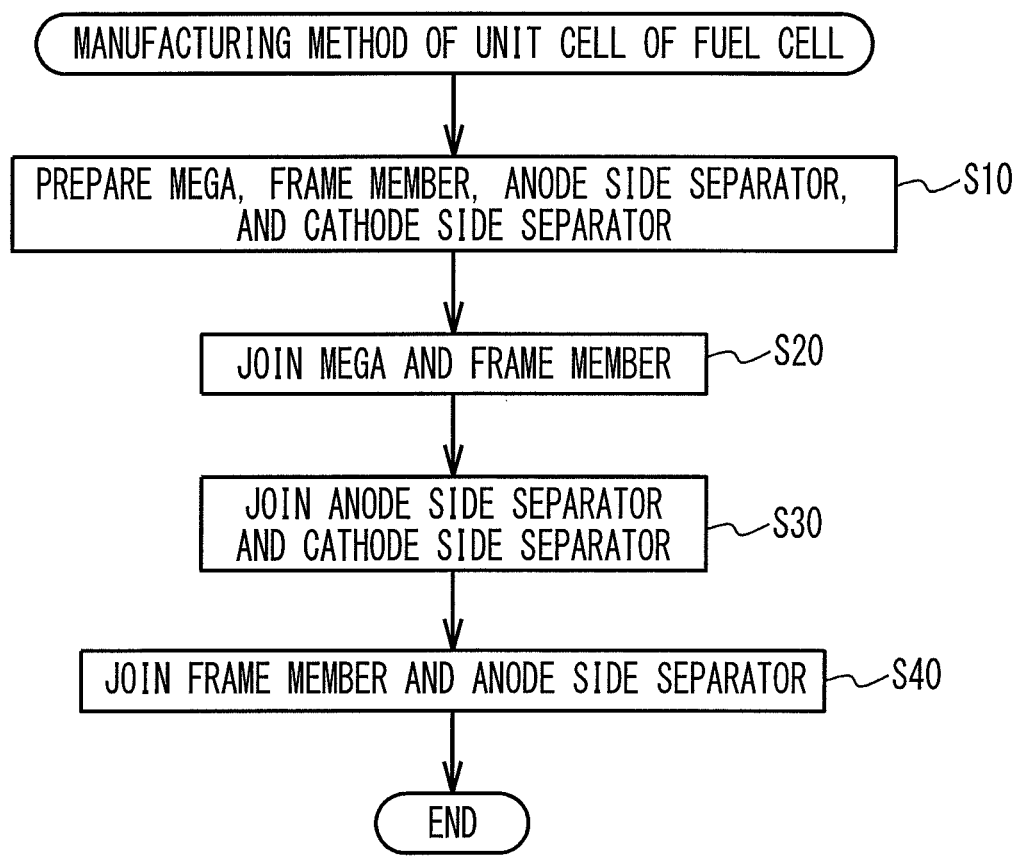
FIG. 3 is a flowchart illustrating a manufacturing method of the unit cell of the fuel cell.

Next, a manufacturing method of the unit cell 60 will be described. FIG. 3 is a flowchart illustrating the manufacturing method of the unit cell 60. Firstly, the MEGA 20, the frame member 40, and the separators 33a and 33c are prepared (step S10). Secondly, a part of the other surface of the frame member 40 close to the inner peripheral edge 42e is joined to the peripheral region 11e of the electrolyte membrane 11 with the adhesive bond 50 (step S20). Thirdly, the separators 33c and 33a are joined to each other by, for example, laser welding (step S30). Finally, the frame member 40 and the separator 33c are joined to each other with, for example, an ultraviolet curing resin (step S40). Additionally, the order of steps S30 and S40 may be reversed. The step S10 is an example of a step of preparing the MEGA 20 and a step of preparing the frame member 40.

Figure 4:
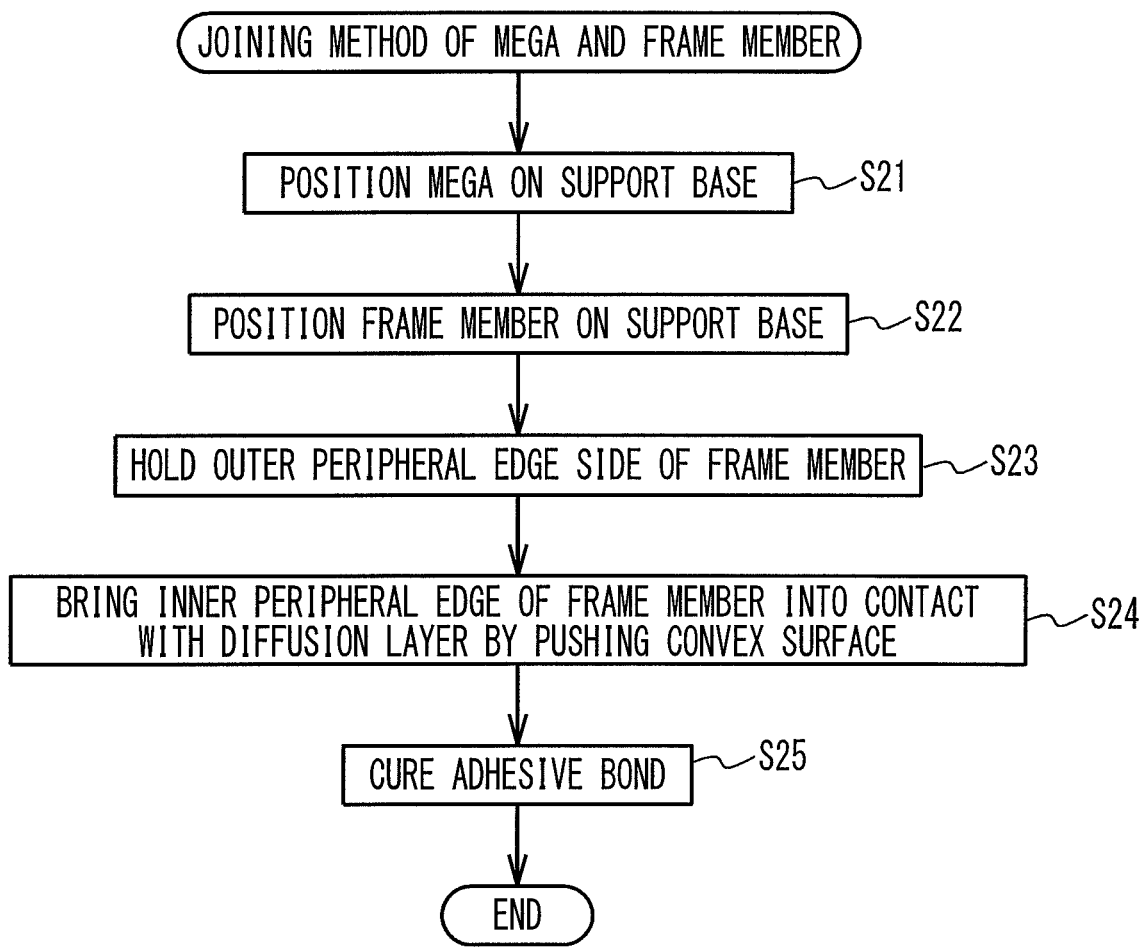
FIG. 4 is a flowchart illustrating a joining method of a MEGA and a frame member.
Figure 5A:
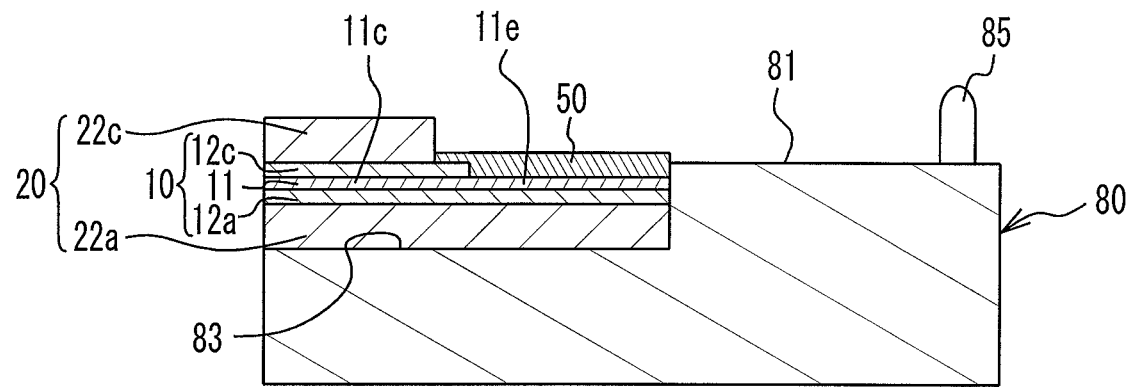
FIGS. 5A and 5B are explanatory views of the joining method of the MEGA and the frame member.
Figure 5B:
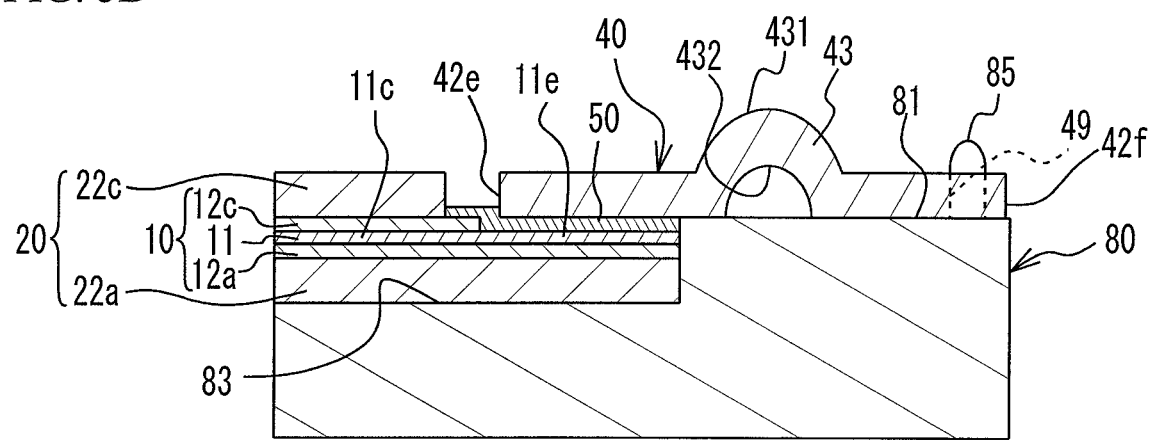
Figure 6A:
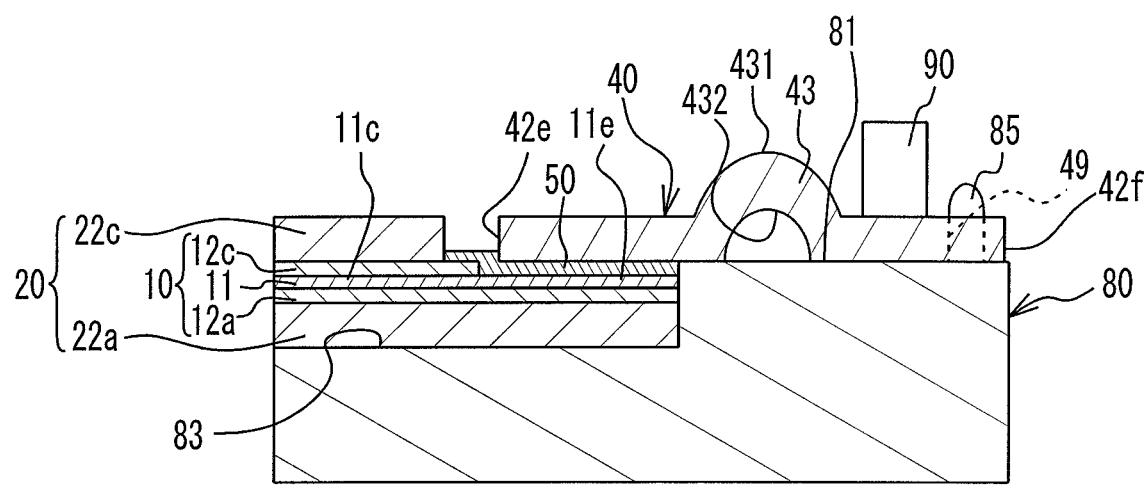
FIGS. 6A and 6B are explanatory views of the joining method of the MEGA and the frame member.
Figure 6B:
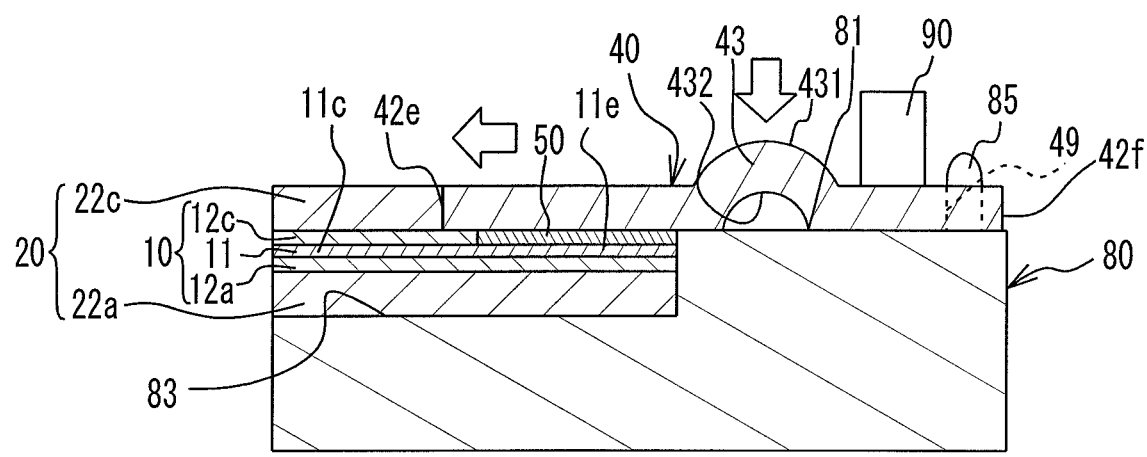

Next, a joining method of the MEGA 20 and the frame member 40 will be described in detail. FIG. 4 is a flowchart illustrating the joining method of the MEGA 20 and the frame member 40. FIGS. 5A, 5B, 6A, and 6B are explanatory views of the joining method of the MEGA 20 and the frame member 40. In FIGS. 5B, 6A, and 6B, illustration of the gaskets 46 and the like is omitted, in order to facilitate understanding. Firstly, as illustrated in FIG. 5A, the MEGA 20 is positioned on a support base 80 (step S21). A depressed portion 83 capable of accommodating the diffusion layer 22a of the MEGA 20 is formed in the central portion of an upper surface 81 of the support base 80. A depth of the depressed portion 83 is set to be substantially the same as the total thickness of the MEA 10 and the diffusion layer 22a.

The upper surface 81 of the support base 80 is provided with two positioning pins 85 on a substantially diagonal line of the depressed portion 83 so as to sandwich the depressed portion 83. By accommodating the diffusion layer 22a of the MEGA 20 in the depressed portion 83, the MEGA 20 is positioned on the support base 80. The adhesive bond 50 prior to curing is applied on the peripheral region 11e and on the catalyst layer 12c protruding from the diffusion layer 22c by, for example, a dispenser or the like. The adhesive bond 50 will be described later.

Secondly, as illustrated in FIG. 5B, the frame member 40 is positioned on the support base 80 (step S22). Specifically, the positioning pins 85 are inserted into the respective positioning holes 49 provided beforehand in the frame member 40 such that a part of the other surface of the frame member 40 close to the inner peripheral edge 42e (the lower surface in FIG. 5B) is set on the adhesive bond 50. Therefore, the part of the frame member 40 close to the outer peripheral edge 42f is positioned on the support base 80. Herein, since the positioning hole 49 is provided between the outer peripheral edge 42f and the gasket 46, the positioning hole 49 is provided just between the outer peripheral edge 42f and the curved portion 43. Further, at this time, there is a gap between the inner peripheral edge 42e of the frame member 40 and the diffusion layer 22c. Steps S22 and S23 are an example of a step of positioning the MEGA 20 and, a first part of the frame member 40 between the curved portion 43 and the outer peripheral edge 42f, on the support base 80, before the bringing of the inner peripheral edge 42e of the frame member 40 into contact with the diffusion layer 22c as described later.

Thirdly, as illustrated in FIG. 6A, a part of the frame member 40 between the positioning pin 85 and the curved portion 43 is held on the upper surface 81 of the support base 80 by a pushing member 90 (step S23). The pushing member 90 has a shape extending in such a direction that the curved portion 43 extends. The pushing member 90 preferably pushes the portion of the frame member 40 not interfering with the gaskets 46 and 48 not illustrated in FIG. 6A. Step S23 is an example of a step of holding a second part of the frame member 40 between the curved portion 43 and the first part of the frame member 40 positioned, to the support base 80, before the bringing of the inner peripheral edge 42e of the frame member 40 into contact with the diffusion layer 22c.

Fourthly, as illustrated in FIG. 6B, the inner peripheral edge 42e of the frame member 40 is brought into contact with the diffusion layer 22c by pushing the convex surface 431 to the upper surface 81 of the support base 80 so as to be crushed (step S24). Herein, by pushing the convex surface 431, the curved portion 43 is crushed so that each curvature of the convex surface 431 and the concave surface 432 becomes small. Accordingly, the curved portion 43 is expanded so that the inner peripheral edge 42e can be brought into contact with the diffusion layer 22c. Step S24 is an example of a step of bringing the inner peripheral edge 42e of the frame member 40 into contact with the diffusion layer 22c by pushing the convex surface 431 and by deforming the curved portion 43, in the state where the other surface of the frame member 40 at the inner peripheral edge side is in contact with the peripheral region 11e through the adhesive bond 50.

Fifthly, in the state where the inner peripheral edge 42e is maintained in contact with the diffusion layer 22c, the adhesive bond 50 is irradiated with ultraviolet rays to cure the adhesive bond 50 (step S25). In addition, the frame member 40 has ultraviolet transparency. In such a way, the MEGA 20 and the frame member 40 are joined to each other. After the MEGA 20 and the frame member 40 are joined to each other, the frame member 40 is joined to the separators 33c and 33a so as to substantially align the outer peripheral edge 42f of the frame member 40 with the outer peripheral edges of the separators 33c and 33a as described above, which completes the unit cell 60. Step S25 is an example of a step of joining the frame member 40 and the MEGA 20 with the adhesive bond 50, in the state where the inner peripheral edge 42e of the frame member 40 is in contact with the diffusion layer 22c.

Even if the frame member 40 is not heated in such a way, the inner peripheral edge 42e can be brought into contact with the diffusion layer 22c by pushing the convex surface 431 and by deforming the curved portion 43, whereby the MEGA 20 and the frame member 40 are joined to each other. It is therefore possible to reduce a heating period of the frame member 40, and to suppress a decrease in productivity. Additionally, since the inner peripheral edge 42e and the diffusion layer 22c can be joined to each other without creating a gap therebetween, durability of the electrolyte membrane 11 can be ensured. Further, since the concave surface 432 opposite to the convex surface 431 is spaced apart from the surface of the separator 33a, even when the small pushing force exerts on the convex surface, the curved portion 43 can be easily deformed, which can facilitate bringing the inner peripheral edge 42e into contact with the diffusion layer 22c.

Moreover, when the convex surface 431 is pushed in step S24, step S23 described above suppresses floating of the part of the frame member 40 between the convex surface 431 and the positioned part of the frame member 40 away from the upper surface 81 of the support base 80. Accordingly, the frame member 40 formed into a desired shape can be joined to the MEGA 20.

As for the adhesive bond 50 applied on the peripheral region 11e and on the outer peripheral side of the catalyst layer 12c protruding from the diffusion layer 22c in FIG. 5, the adhesive bond 50 may be applied when or before the MEGA 20 is accommodated in the depressed portion 83 of the support base 80. In case of using a thermosetting adhesive bond instead of the ultraviolet curable adhesive bond 50, the frame member 40 may be joined to the MEGA 20 by hot pressing in the state where the inner peripheral edge 42e of the frame member 40 is in contact with the diffusion layer 22c as illustrated in FIG. 6B. In addition, a curing temperature of the thermosetting adhesive bond for joining the frame member 40 and the MEGA 20 is lower than the heat resistant temperature of the frame member 40.

As illustrated in FIGS. 1 and 2, the curved portion 43 of the completed unit cell 60 has a shape that maintains the convex surface 431 and the concave surface 432, but is not limited thereto. For example, as for the joining step of the MEGA 20 and the frame member 40, the pushing of the convex surface 431 may cause the convex surface 431 and the concave surface 432 to be flat to bring the inner peripheral edge 42e of the frame member 40 into contact with the diffusion layer 22c, which may join the frame member 40 and the MEGA 20 to each other. Further, although a height of the convex surface 431 is lower than each height of the gaskets 46 and 48 in FIG. 2, the height of the convex surface 431 is desirably set so as not to contact with a separator of another adjacent unit cell when the plural unit cells 60 are stacked. Likewise, the convex surface 431 is desirably provided at such a position as not to contact with the separator of another adjacent unit cell.

In the frame member 40 according to the present embodiment, the curved portions 43 are formed along two respective long sides of the inner peripheral edge 42e having a substantially rectangular shape. However, the curved portion 43 may be any that is formed along at least one of the sides of the inner peripheral edge 42e. The curved portion 43 may be formed along the entire periphery of the inner peripheral edge 42e. Although the frame member 40 is positioned by the positioning pins 85 in the present embodiment, a shape of a member for positioning the frame member 40 is not limited to the pin shape. For example, the frame member 40 may be positioned on the support base by bringing the outer peripheral edge 42f of the frame member 40 into contact with a wall portion or a protruding portion formed on the support base. Further, the gaskets 46 to 48 may be provided on the frame member 40 after the joining step of the MEGA 20 and the frame member 40 is completed.

Figure 7A:
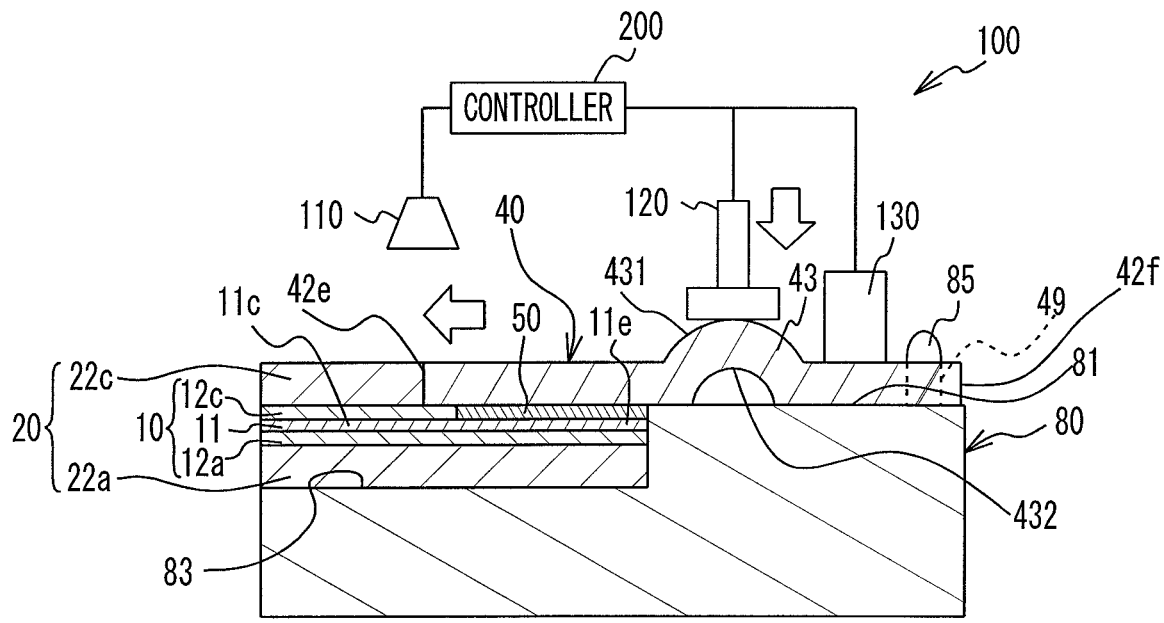
FIG. 7A is an explanatory view of a system for achieving the joining method.

FIG. 7A is an explanatory view of a system 100 for achieving the above joining method. A controller 200 is a microcomputer including a Central Processing Unit (CPU), a Read Only Memory (ROM), a Random Access Memory (RAM), a memory, and the like, and controls a camera 110, a pushing mechanism 120, and a holding mechanism 130. The pushing mechanism 120 and the holding mechanism 130 are controlled to move upwardly and downwardly by the controller 200. The holding mechanism 130 moves downwardly between the curved portion 43 and the positioning pin 85 to hold the part of the frame member 40 between the curbed portion 43 and the outer peripheral edge 42f to the upper surface 81 of the support base 80. Next, the pushing mechanism 120 pushes the convex surface 431. The camera 110 images a gap between the inner peripheral edge 42e and the diffusion layer 22c, and the controller 200 adjusts the pushing force of the pushing mechanism 120 on the basis of the captured image such that the gap becomes zero. After that, the adhesive bond 50 is cured. In such a manner, the pushing force exerting on the convex surface 431 by the pushing mechanism 120 may be adjusted based on the image captured by the camera 110.

Figure 7B:
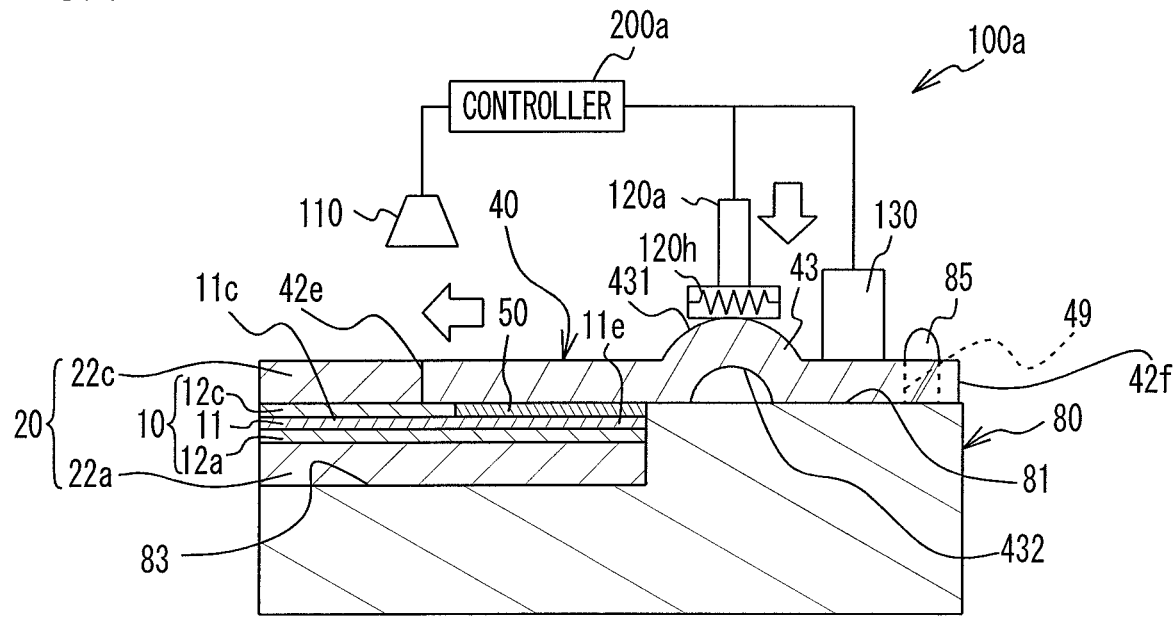
FIG. 7B is an explanatory view of a system according to a variation.

FIG. 7B is an explanatory view of a system 100a according to a variation. In addition, the same components are denoted by the same reference numerals, and a duplicated explanation is omitted. A pushing mechanism 120a includes a built-in heater 120h. When the pushing mechanism 120a pushes the convex surface 431, the convex surface 431 is pushed while being heated by the built-in heater 120h of the pushing mechanism 120a controlled by a controller 200a. This can reduce the residual stress in the curved portion 43 after the pushing force is released from the convex surface 431, thereby suppressing peeling off of the frame member 40 from the MEGA 20 due to the residual stress in the curved portion 43, and thereby suppressing warpage of the frame member 40. Additionally, a heating value applied to the convex surface 431 when the pushing mechanism 120a pushes the convex surface 431 may be adjusted so as to heat the frame member 40 at a temperature below the melting point of the material thereof, in order not to melt the convex surface 431, and in order to easily deform and soften the curved portion 43.

Herein, the material of the resin-made frame member 40 can be polypropylene (PP), polyethylene naphthalate (PEN), polyethylene terephthalate (PET), polyphenylene sulfide (PPS), syndiotactic polystyrene (SPS), cyclic olefin copolymer (COC), or the like, but is not limited thereto. As for each melting point of the materials, PP is 160 degrees Celsius. PEN is 265 degrees Celsius. PET is 260 degrees Celsius. PPS is 280 degrees Celsius. SPS is 270 degrees Celsius. COC is 250 degrees Celsius. As described above, when the convex surface 431 is pushed while being heated, it is preferable to heat the convex surface 431 at a temperature lower than the above melting point. Even when the convex surface 431 is heated at a temperature higher than the melting point, the frame member 40 does not completely melt as long as the convex surface 431 is heated for a short time. Thus, the curved portion 43 can be easily deformed by pushing the convex surface 431 with a relatively weak force.

Figure 8A:
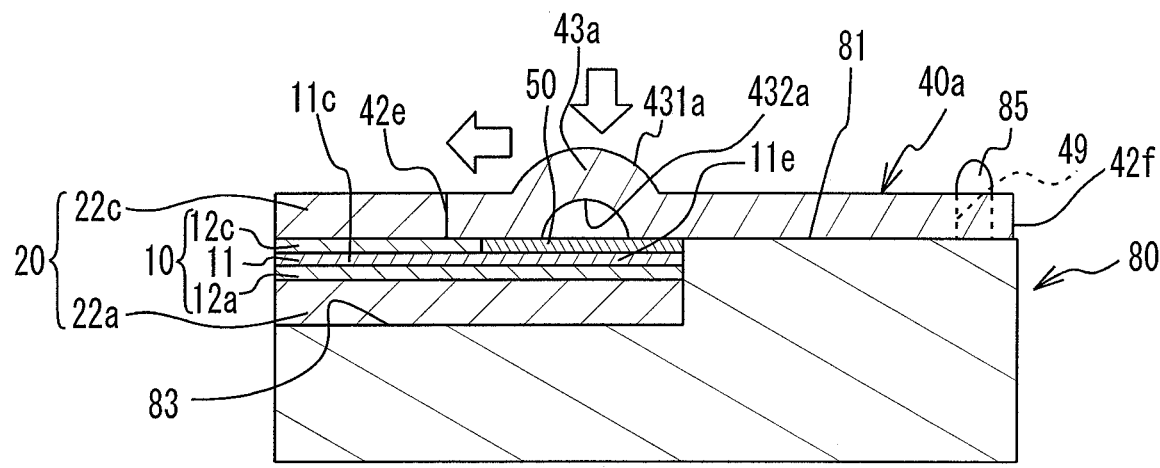
FIGS. 8A and 8B are explanatory views of frame members according to variations.

Next, a frame member 40a according to a variation will be described. FIG. 8A is an explanatory view of the frame member 40a according to the variation. Additionally, the same components are denoted by the same reference numerals, and a duplicated explanation is omitted. A curved portion 43a of the frame member 40a is arranged on the peripheral region 11e of the electrolyte membrane 11. Also in this case, the peripheral region 11e and the diffusion layer 22c are brought into contact with each other by pushing a convex surface 431a, and then the frame member 40a and the MEGA 20 can be joined. Additionally, since the curved portion 43a is arranged above the electrolyte membrane 11 in this variation, it is desirable to use the ultraviolet curable adhesive bond 50 for joining the frame member 40a and the MEGA 20. Further, the position and the height of the convex surface 431a is desirably set so as not to come into contact with a separator when the completed unit cells are stacked. In this variation, a concave surface 432a is spaced apart from the electrolyte membrane 11, but it is not limited to this. The illustrated concave surface 432a may have a flat shape so as to be in contact with the electrolyte membrane 11.

Figure 8B:
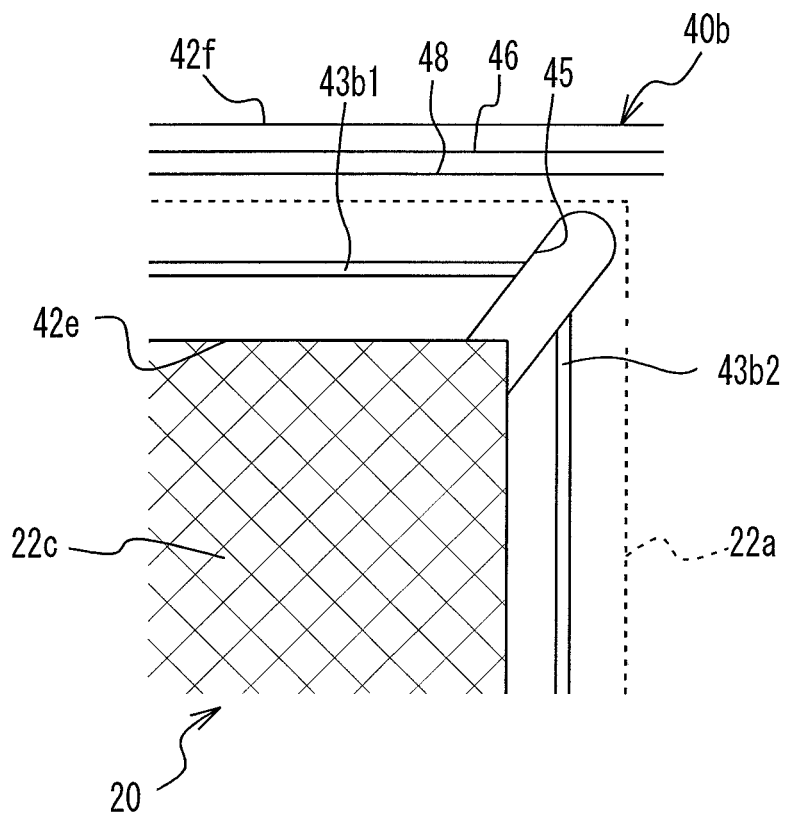

Next, a frame member 40b according to a variation will be described. FIG. 8B is a partially enlarged view of the frame member 40b according to the variation after being joined to the MEGA 20 when viewed from above. Curved portions 43b1 and 43b2 and a notch portion 45 are formed in the frame member 40b. The curved portion 43b1 extends along the long side of the inner peripheral edge 42e. The curved portion 43b2 extends in the direction substantially perpendicular to the curved portion 43b1 and along the short side of the inner peripheral edge 42e. Further, the cutout portion 45 is formed continuously from the inner peripheral edge 42e so as to separate the curved portions 43b1 and 43b2. Thus, when one of the curved portions 43b1 and 43b2 is pushed in the joining step of the frame member 40b and the MEGA 20, the notch portion 45 absorbs deformation, which suppresses the other of the curved portions 43b1 and 43b2 from being deformed. Therefore, the two adjacent sides of the inner peripheral edge 42e can be respectively brought into contact with the two sides of the diffusion layer 22c, whereby the frame member 40b and the MEGA 20 are joined to each other. The curved portions 43b1 and 43b2 are an example of first and second curved portions along the two adjacent sides of the inner peripheral edge 42e.

Additionally, since the notch portion 45 is formed within a region overlapping the electrolyte membrane 11, the cathode gas and the anode gas are suppressed from being mixed. Further, the curved portions 43b1 and 43b2 overlap the electrolyte membrane 11, like the frame member 40a illustrated in FIG. 8A. At the time when the frame member 40b is arranged on the MEGA 20 through the adhesive bond 50, the gap between the long side of the inner peripheral edge 42e and the diffusion layer 22c might differ from the gap between the short side of the inner peripheral edge 42e and the diffusion layer 22c. For this reason, the adjacent two sides of the inner peripheral edge 42e may be brought into contact with the diffusion layer 22c by controlling stroke and load of the pushing of each of the curved portions 43b1 and 43b2.

Although the notch portion 45 is not limited to the shape illustrated in FIG. 8B, it is preferable to expose a small area of the electrolyte membrane 11 from the notch portion 45 in consideration of ensuring the durability of the electrolyte membrane 11. For this reason, for example, the notch portion 45 has such a shape so as not to bring a portion of the frame member 40 close to the curved portion 43b1 and a portion of the frame member 40 close to the curved portion 43b2 into contact with each other through the cutout portion 45, even when convex surfaces of the curved portion 43b1 and the curved portion 43b2 are pushed. Further, it is preferable to cover a surface of the electrolyte membrane 11 exposed from the notch portion 45 with the adhesive bond 50 in consideration of ensuring the durability of the electrolyte membrane 11.

Although some embodiments of the present invention have been described in detail, the present invention is not limited to the specific embodiments but may be varied or changed within the scope of the present invention as claimed.

In the above embodiment, the curved portion 43 is provided along one side of the inner peripheral edge 42e as illustrated in FIG. 2, but is not limited thereto. For example, two or more pairs of the curved portions 43 substantially parallel to each other may be formed along one side of the inner peripheral edge 42e. This also applies to the variation illustrated in FIG. 8A.

The above embodiment exemplary describes the MEGA 20 in which the outer peripheral shape of the diffusion layer 22c is smaller than that of the diffusion layer 22a and in which the catalyst layer 12c and the diffusion layer 22c are provided so as to expose the peripheral region 11e of the electrolyte membrane 11. However, the MEGA 20 is not limited thereto. The joining methods according to the above-described embodiment and variations may be adapted even for, for example, a MEGA in which the outer peripheral shape of the anode side diffusion layer is smaller than that of the cathode side diffusion layer and in which the anode catalyst layer and the anode side gas diffusion layer are provided so as to expose the peripheral region of the electrolyte membrane. Also in this case, like the above-described embodiment, in the state where the surface, close to the inner peripheral edge 42e side, at which the concave surface 432 of the frame member 40 is recessed overlaps the peripheral region through the adhesive bond, the convex surface 431 is pushed to bring the inner peripheral edge 42e and the anode side gas diffusion layer into contact with each other, and then the adhesive is cured to join the MEGA and the frame member 40.

What is claimed is:

1. A manufacturing method of a unit cell of a fuel cell, comprising:
preparing a membrane-electrode-gas diffusion layer assembly including:
an electrolyte membrane;
a first catalyst layer formed on one surface of the electrolyte membrane so as to expose a peripheral region of the one surface of the electrolyte membrane;
a second catalyst layer formed on another surface of the electrolyte membrane;
a first gas diffusion layer joined to the first catalyst layer so as to expose the peripheral region; and a second gas diffusion layer joined to the second catalyst layer;

preparing a frame member that has ultraviolet transparency and that is made of resin, the frame member including:

an outer peripheral edge larger than the electrolyte membrane;

an inner peripheral edge smaller than the electrolyte membrane and larger than the first gas diffusion layer; and a curved portion positioned between the outer peripheral edge and the inner peripheral edge, and defined by a convex surface protruding from one surface of the frame member and by a concave surface concaved from another surface of the frame member;

positioning the membrane-electrode-gas diffusion layer assembly, and a first part of the frame member between the curved portion and the outer peripheral edge, on a support base, wherein the positioning is performed by inserting a positioning pin formed on the support base into a positioning hole formed in the frame member;

after the positioning of the membrane-electrode-gas diffusion layer assembly and the first part of the frame member on the support base, bringing the inner peripheral edge of the frame member into contact with the first gas diffusion layer by pushing the convex surface and by deforming the curved portion while the positioning pin is inserted into the positioning hole, in a state where the another surface of the frame member is in contact with the peripheral region through an adhesive bond that is an ultraviolet curable resin; and joining the frame member and the membrane-electrode-gas diffusion layer assembly with the adhesive bond by irradiating ultraviolet to the adhesive bond through the frame member, in a state where the inner peripheral edge of the frame member is in contact with the first gas diffusion layer.

2. The manufacturing method of the unit cell of the fuel cell of claim 1, further comprising holding a second part of the frame member between the curved portion and the first part of the frame member positioned, to the support base, before the bringing of the inner peripheral edge of the frame member into contact with the first gas diffusion layer.

3. The manufacturing method of the unit cell of the fuel cell of claim 1, wherein in the bringing of the inner peripheral edge of the frame member into contact with the first gas diffusion layer, the convex surface is pushed while the curved portion is heated.

4. The manufacturing method of the unit cell of the fuel cell of claim 3, wherein in the bringing of the inner peripheral edge of the frame member into contact with the first gas diffusion layer, the convex surface is pushed while the curved portion is heated to a temperature below a melting point of the frame member.

5. The manufacturing method of the unit cell of the fuel cell of claim 1, wherein the curved portion includes first and second curved portions respectively provided along first and second sides of the inner peripheral edge adjacent to each other, and the frame member includes a notch portion continuous to the inner peripheral edge and separating the first and second curved portions from each other.

* * * * *